United States Patent
Boivin

[11] 3,774,987
[45] Nov. 27, 1973

[54] COUPLING OF LASERS TO OPTICAL FIBRES

[75] Inventor: Louis Philippe Boivin, Ottawa, Ontario, Canada

[73] Assignee: Bell Canada-Northern Electric Research Limited, Ottawa, Ontario, Canada

[22] Filed: June 27, 1972

[21] Appl. No.: 266,674

[52] U.S. Cl. .................... 350/96 WG, 350/162 R
[51] Int. Cl. ........................................ G02b 5/14
[58] Field of Search .................... 350/96 WG

[56] References Cited
UNITED STATES PATENTS

| | | | |
|---|---|---|---|
| 3,674,337 | 7/1972 | Marcatili | 350/96 WG |
| 3,674,335 | 7/1972 | Ashkin et al. | 350/96 WG |
| 3,614,198 | 10/1971 | Martin et al. | 350/96 WG |
| 3,674,336 | 7/1972 | Kogelnik | 350/96 WG |
| 3,610,727 | 10/1971 | Ulrich | 350/96 WG |
| 3,704,996 | 12/1972 | Borner et al. | 350/96 WG |

FOREIGN PATENTS OR APPLICATIONS

| | | | |
|---|---|---|---|
| 1,807,574 | 7/1969 | Germany | 350/96 WG |

*Primary Examiner*—John K. Corbin
*Attorney*—Sidney T. Jelly

[57] ABSTRACT

A laser is coupled to an optical fibre by coupling the laser beam to a planar waveguide, and coupling the waveguide to the fibre. Particularly the laser beam is coupled to the planar waveguide by a grating. For ease in obtaining and maintaining good alignment between waveguide and fibre core, the fibre is positioned in a groove in a support member. Crystallographic etching a Vee groove gives a simple and effective way of forming the groove in the support member.

3 Claims, 6 Drawing Figures

PATENTED NOV 27 1973   3,774,987

COUPLING OF LASERS TO OPTICAL FIBRES

This invention relates to the coupling of lasers to optical fibres, particularly though not exclusively for optical commuinication systems.

Lasers and optical fibres have both been used for communication systems, and the combinations of laser and optical fibre has been proposed. However, the efficient coupling of a laser to an optical fibre is a problem which has not been adequately solved for practical systems, particularly for single mode fibres.

A commonly used technique is to focus the laser beam onto the entrance face of the fibre by a microscope objective. If the laser beam is gaussian an efficiency of approximately 90 percent can be achieved. However with the GaAs lasers the small size of the cavity causes strong diffraction effects in the beam. The diffraction effects coupled with a complex mode structure of the beam makes it difficult to focus the beam to a small spot —for example of the order of 4 microns in diameter. Also, while focussing the beam by a lens may be acceptable for a laboratory arrangement, it would not be acceptable in a practical system because of the high alignment tolerances required and the very shallow depth of focus which a very small focussed spot will involve. Both these factors make a system very susceptible to vibration, thermal expansion and other difficulties.

The present invention provides for the coupling of a laser to an optical fibre in a relatively simple and efficient manner. The laser beam is coupled to a planar waveguide and the waveguide focusses the beam to an output window closely coupled to an optical fibre.

Broadly the present invention comprises a planar waveguide; an optical fibre; means for coupling a laser beam to the planar waveguide; and means for supporting the optical fibre with its axis parallel to the waveguide axis; the waveguide adapted to focus a beam from the laser onto the end of the optical fibre. A particularly convenient means for coupling the laser beam to the planar waveguide is a grating.

The invention will be readily understood by the following description of certain embodiments, by way of example, in conjunction with the accompanying diagrammatic drawings, in which.

Figure 1:
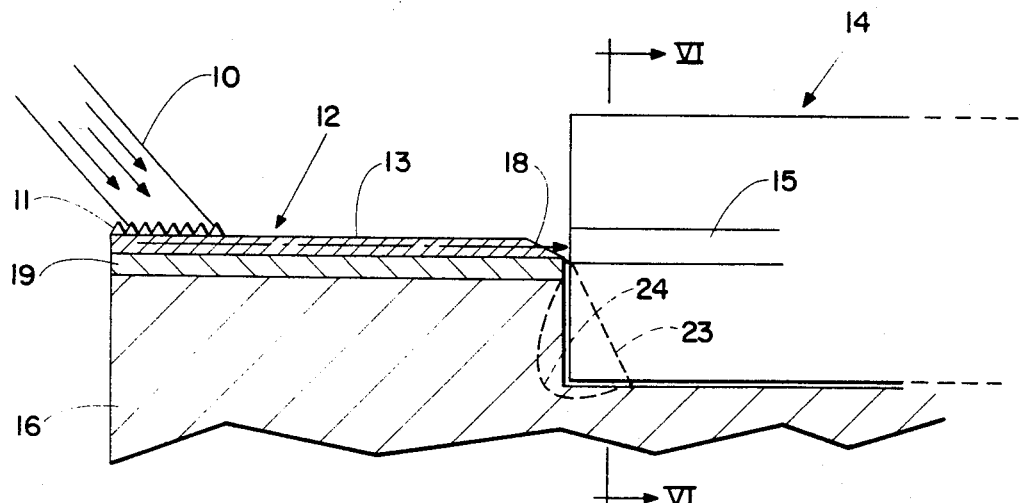
FIG. 1 is a longitudinal cross-section through a complete system.
Figures 2, 3, 4, 5:
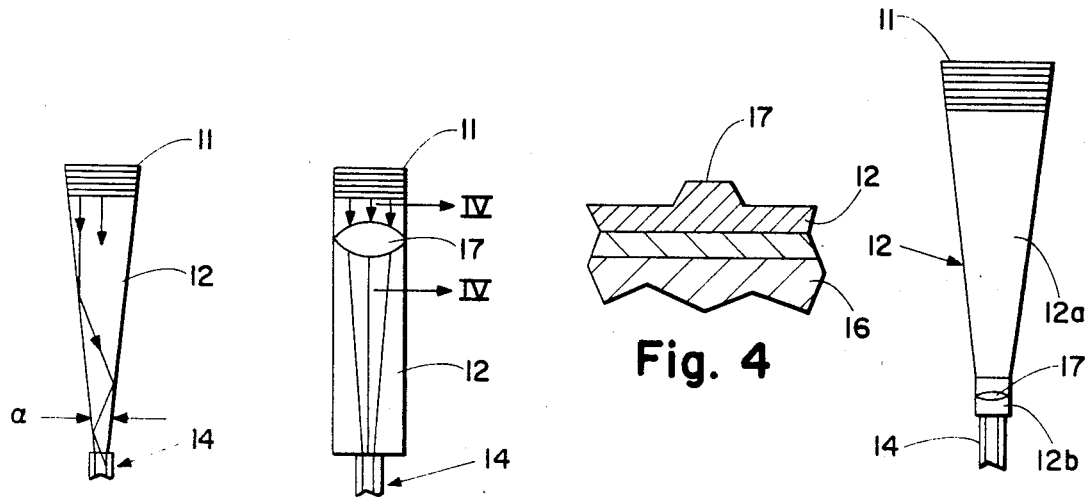
FIG. 2 is a plan view of the arrangement of FIG. 1.
FIG. 3 is a view similar to that of FIG. 2 but of an alternative arrangement.
FIG. 4 is a cross-section on the line IV—IV of FIG. 3.
FIG. 5 is a plan view of a further alternative arrangement.

As illustrated in FIG. 1, a laser beam 10 is directed onto a coupler 11 —in the present example a grating— where the beam is coupled into a planar waveguide 12. The beam passes along the waveguide as indicated at 13. An optical fibre 14, hereinafter referred to as a fibre, is mounted axially in line with the longitudinal axis of the waveguide. Fibre 14 has a core 15 which is the light conveying component. The light is retained within the core by internal surface reflection in the known manner. The waveguide 12 and fibre 14 are mounted on a substrate 16. The laser beam 10 is of relatively large diameter. By being coupled into the waveguide 12 it becomes a wide thin beam 13 and it is then necessary to focus this beam down to the approximate dimensions of the fibre core 15. FIG. 2 illustrates one way of focussing the beam 13. In FIG. 2 the waveguide 12 is of wedge-shape when viewed in the plane of the cross-section of FIG. 1. After the laser beam 10 is coupled into the waveguide 12 by the grating 11, the beam is focussed by internal reflection within the waveguide. The angle of the wedge is quite small, for example the angle α is approximately 2° although slightly larger angles can be used, and also smaller angles.

An alternative form of focussing is illustrated in FIGS. 3 and 4. A thin film lens 17 is formed on the waveguide 12. The lens 17 is formed by increasing the thickness of the waveguide locally, as seen in FIG. 4, the increase in thickness having a lens form when viewed normal to the plane of the waveguide, as seen in FIG. 3. The lens 17 can be formed by first making the waveguide of a total thickness equal to the overall thickness of the lens and then removing material —as by etching— to leave the lens structure. An alternative method is to first form the waveguide 12 to its correct thickness and then form the extra thickness of the lens by applying a further localized layer of the same material as the waveguide. A further alternative is to form the extra thickness of the lens by applying an additional localized layer of material having an index of refraction slightly lower than that of the main waveguide layer. For example, with a main waveguide layer of index 1.6, the additional layer could have an index of 1.55. Normal photo masking techniques can be used to make these thin film lenses. The additional thickness at the lens 17 changes the effective index of the waveguide in the lenticular region, causing focussing of the beam.

FIG. 5 illustrates a combination of the alternate forms of focussing as illustrated in FIGS. 2 and 3. The planar waveguide 12 is of two portions, a tapered or wedge-shaped portion 12a, as in FIG. 2, followed by a parallel portion 12b, as in FIG. 3. The grating 11 is coupled to the wide end of the portion 12a. A thin film lens 17 is formed on the parallel portion 12b, being of the same form as the lens 17 in FIG. 3. The parallel portion 12b is coupled to the fibre 14, as shown.

Having been focussed the beam is injected into the core 15 of the fibre 14 by close coupling the end of the film to the end of the waveguide, the core 15 axially aligned with the waveguide. The coupling of waveguide to film can be improved under some conditions by chamferring the end of the waveguide as shown at 18.

Considering now the individual items, the laser beam to waveguide coupler 11 can be of various forms. For ease of fabrication and ease of operation a grating coupler is generally most convenient and can be made as efficient as a prism coupler, which is an alternative. Basically there are two types of grating couplers —thin phase gratings and thick Bragg-angle gratings. Thick Bragg-angle gratings can be made so as to give efficiencies of the order of 75 percent. Sinusoidal thin phase gratings are easier to make but have an efficiency normally of the order of 35 percent. However, by using a relatively large angle of incidence, and adjusting the groove shape, blazing effects can be produced, to make such gratings approximately 70–80 percent efficient. For example, the grating can have a saw-tooth cross-section and of a profile to suit the installation. One feature to be considered, for example, is the angle of incidence of the laser beam onto the grating. The pitch of the grating will depend on various details to couple into the lowest order mode of a thin film waveguide the pitch of the grating needs to be about 1 micron, at a wavelength of 0.63 micron, for example. The grating can be made by any convenient method, a typical method being by exposing photo-resist to interfering laser beams.

It is proposed that the substrate 16 be of silicon, for reasons to be explained later. However other materials can be used, for example glass and various synthetic crystals such as GaAs and GaP. The waveguide 12, to be effective, must be on a substrate, or layer, having a refractory index lower than that of the waveguide. If the waveguide is deposited or otherwise placed on a substrate having a suitable refractory index value then the waveguide can be directly on the substrate. However if the substrate is not of material having an acceptable refractory index, an intervening layer is required. Thus, as illustrated in FIG. 1, with substrate 16 of silicon, it is necessary to provide a low index layer 19. Suitable materials for the low index layer are $SiO_2$ and an epoxy resin such as is made by Dow Corning under the reference XR–63–503. $SiO_2$ has a value for $n$ approximately equal to 1.45 and the epoxy resin approximately 1.40. To reduce losses due to interaction of the evanescent wave with the silicon substrate a thickness of about 2 microns for the low index layer is preferred.

The high index layer that is the layer 12 in which the light is transmitted or conveyed —can also be of differing materials. One material is a photo-resist known as KPR, having an index $n=1.61$. The attenuation of this material is approximately 7db/cm at 0.63 micron decreasing to approximately 1db/cm at 1 micron. An alternative is a lead-silica spin-on oxide, having a controllable index of refraction n of 1.44 to 1.66 and a lower attenuation coefficient of from about 0.5db/cm at 0.63 microns to 0.3db/cm at 1 micron. An advantage of using a photo-resist as a waveguide material is the facility with which it can be used to make waveguides of arbitrary shape; no etching or sputtering is required. Also it is very easy to make tapered edges which can be important for coupling the light out of the waveguide or for reducing reflection losses at thin film lens interfaces for example.

With the materials described the thickness of the light conveying layer to support only the $TE_o$ or $TM_o$ modes must be between 0.14 and 0.58 micron (for $\lambda = 0.63$ micron) or between 0.2 and 0.83 microns (for $\lambda = 0.9$ micron). In practice the layer would be about 0.5 micron for $\lambda = 0.63$ micron and about 0.7 micron for $\lambda = 0.9$ micron. It is easy to provide layers of these thicknesses with either KPR or $SiO_2$–PbO spin-oxide.

The alignment of the fibre core 15 with the waveguide 12 is very important. While various materials can be used for the substrate 16, as stated previously, silicon has been proposed as having certain advantages. A most important advantage is that silicon can be crystallographically etched. Crystallographic etching has an advantage in that etching is preferential in direction, being related to the crystal planes. As such it is very suitable for producing Vee shaped grooves. Thus a channel can be etched in silicon which can be maintained to very close telerances as the width and positioning of the channel will depend almost only on the positioning of the photo-etching mask. The mask can be positioned accurately to 1 micron. The etching will provide a channel or groove having sides sloping in towards the bottom of the channel.

Figure 6:
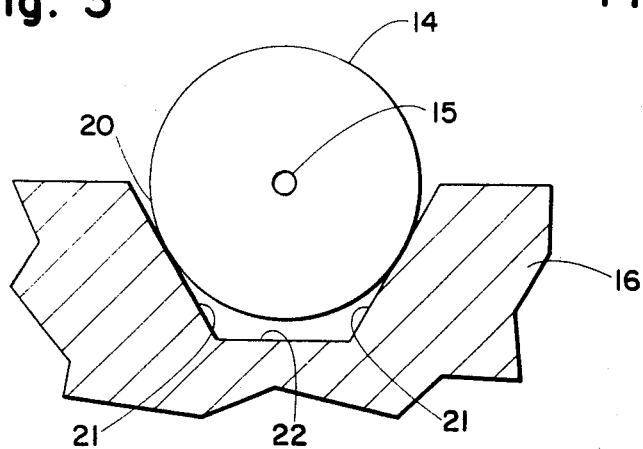
FIG. 6 is a cross-section on the line VI—VI of FIG. 1.

FIG. 6 illustrates a cross-section through a channel 20 in the substrate 16. As channel 20 is etched it becomes progressively narrower and if etching is permitted to carry on the sides 21 will meet at the bottom of an acute angle. The increase in width of the channel during etching is extremely slow compared to the speed of etching downwards. Therefore it will be appreciated that, knowing the external diameter of the fibre 14 it is very easy to decide on a desired width of channel to give a predetermined position of the fibre core 15. Crystallographic etching is self-limiting in that because of the preferential direction of etching, time is not a critical factor. As long as etching is continued, to ensure that the bottom surface 22 will be clear of a fibre 14 resting in the channel 20, any further etching will have a very limited effect on the position of the fibre as the width of the channel will increase only by an extremely small amount, well within acceptable tolerances for positioning the fibre.

However, it is not necessary to restrict the substrate to silicon, other materials can be used and other conventional methods used to form the channel 20, which can be parallel sided.

If the channel 20 is crystallographically etched, because the etch is preferential it produces a tapered cross-section. This form of cross-section is useful for the channel when considered normal to the length of the channel as it helps in positioning the fibre. However an inclined surface may also be formed at the channel end, that is at the junction of the channel 20, with the end of the waveguide 12. Such an inclined end is indicated by the dotted line 23 in FIG. 1. To permit close coupling of the end face of the fibre 14 with the end of the waveguide 12 this inclined surface would be etched away by an alternative form of etching, of conventional form. Ideally a sharp corner is preferred, but some undercutting, as indicated at 24 in FIG. 1, is likely to occur, but this will not affect the positioning of the fibre. However the inclined surface does not usually occur, its presence depending upon the characteristics of the wafer.

The coupling efficiency between waveguide and fibre would be improved by imbedding the coupling region in a quasi index matching resin, $n = 1.5$, to reduce reflection losses.

What is claimed is:

1. Apparatus for coupling a laser to an optical fibre, comprising:
   a planar thin film waveguide mounted on a silicon substrate;
   an optical grating coupler for coupling the laser beam into the waveguide;
   focussing means for focussing the coupled beam at an exit of the waveguide;
   and means for mounting an optical fibre with the core of the fibre substantially coaxial with the axis of the waveguide and aligned with said exit, said means comprising a Vee-shaped channel crystallographically etched in said silicon substrate.

2. Apparatus as claimed in claim 1, wherein said focussing means comprises tapering the waveguide toward the exit.

3. Apparatus as claimed in claim 1 wherein the exit of the waveguide is chamferred.

* * * * *